United States Patent [19]

Kim et al.

[11] Patent Number: 4,989,813
[45] Date of Patent: Feb. 5, 1991

[54] SUPPORTING BASE FOR CONTROLLING HEIGHT, SWIVEL AND INCLINATION OF DISPLAY MEANS

[75] Inventors: Jineui Kim, Pusan; Youngbae Choi, Ulsan; Sangbong Park, Pusan, all of Rep. of Korea

[73] Assignee: Samsung Electron Devices Co., Ltd., Kyungki, Rep. of Korea

[21] Appl. No.: 443,520

[22] Filed: Nov. 29, 1989

[51] Int. Cl.$^5$ ............................................. F16M 11/12
[52] U.S. Cl. ................................... 248/183; 248/123.1; 248/920
[58] Field of Search ............... 248/590, 371, 421, 181, 248/183, 349, 590, 184, 280.1, 123.1, 292.1, 178, 917, 919, 920, 921, 922, 923

[56] References Cited

U.S. PATENT DOCUMENTS

| | | | |
|---|---|---|---|
| 3,123,330 | 3/1964 | Robinson | 248/183 |
| 4,068,961 | 1/1978 | Ebner | 248/181 |
| 4,554,590 | 11/1985 | Chelin | 248/183 X |
| 4,562,988 | 1/1986 | Bumgardner | 248/183 X |
| 4,591,123 | 5/1986 | Bradshaw | 248/349 |
| 4,645,153 | 2/1987 | Granzow | 248/178 |
| 4,691,886 | 9/1987 | Wendling | 248/183 |
| 4,729,533 | 3/1988 | Hillary | 248/184 |
| 4,834,329 | 5/1989 | Delapp | 248/371 X |
| 4,852,500 | 8/1989 | Ryburg | 248/919 |
| 4,880,191 | 11/1989 | Lake | 248/371 |

FOREIGN PATENT DOCUMENTS 746329  3/1956  United Kingdom ................. 248/590

Primary Examiner—J. Franklin Foss

[57] ABSTRACT

A supporting base for controlling height, swivel and inclination of display means such as monitor, television and computer terminal device. The invention is characterized by comprising: first knuckle means N1 in which bosses 4a, 4a of arm 3 are rotatably fixed to bosses 2a, 2a formed at rear end portion of base 1 respectively, and second knuckle means N2 in which bosses 2b, 2b formed at top end of said arm 3 respectively, said first knuckle means N1 and second knuckle means N2 are coupled with tapered pins of knobs at both ends of screw bar, and tapered bushings urged by compression coil springs are inserted to circumference of said tapered pins whereby closely contacting with surface to tapered holes, simultaneously being provided resiliently by torsion springs, respectively. According to the invention, display means such as monitor or computer terminal can be easily fixed any height, inclining angle and swiveling angle to meet easy viewing by user.

3 Claims, 3 Drawing Sheets

SUPPORTING BASE FOR CONTROLLING HEIGHT, SWIVEL AND INCLINATION OF DISPLAY MEANS

BACKGROUND OF THE INVENTION

The present invention relates to a supporting base for monitor, and more particularly, to a supporting base for controlling height, swivel and inclination of display means such as a monitor, television and terminal device (capable of controlling more conveniently).

Because the screen of display means may be exhibited differently it is important to be able to adjust the displayed information with the viewing direction and incident light from outside.

In order to provide such flexibility display means which swivel control the inclining angle have been proposed.

Korean utility model publication No. 85-2006, 2007, 2008, and Japanese utility model publication No. SHO-42821 also describe means of swiveling and controlling the display means.

However, since the display means supporting base of such system is only for inclination and swivel control device but height control means is not included, separate setting means is required at the time of adjusting the product, and if such adjustment is not made the user is not expected to be comfortable.

Further, because the inclination and swivel control device of said display means supporting base has a complicated structure, which is difficult to cast, a device which provides flexibility when viewing at a point that inclining angle and swiveling angle are limited within a predetermined extent, becomes a great improvement.

A device capable of controlling freely the height of the monitor and viewing angle of the screen is proposed in Korean utility model publication No. 85-1889.

According to this model a device is presented in which there is a recess having several hooking steps in circular arc on the top surface of the supporting base, and several supporting grooves are formed on the concave surface, and then a subsidiary supporting base is used in which a convex surface having several rectangular holes is formed on the upper portion of the subsidiary supporting base and several supporting, bars protrude downwardly to the bottom surface, such projections having cut out portions form a circular arc.

However, since this structure controls the height by setting another subsidiary supporting base on the main supporting base, there is a problem whenever the height control distance is limited to the height of subsidiary supporting base, and there is also a storage problem when the device is not used.

SUMMARY OF THE INVENTION

Therefore, the present invention is invented to solve several problems that the conventional display means supporting base has, and it is an object of the present invention to provide a supporting base for easily controlling the height, inclination and swivel of the display means.

In order to realize this, the present invention is characterized in that:

an arm is rotatably fixed to the base by knobs with tapered pins which are coupled to a screw bar in screwing manner from both sides thereof, wherein tapered pins are inserted through tapered bushings respectively, and when the knobs are moved along with said screw bar, the tapered bushings are both expanded and the inclination degree is maintained whereby the height can be controlled; and inclining means similar to the height control system, are provided at the top end of an arm, on which swiveling control means formed by a semispherical body is provided.

The foregoing and other objects as well as advantages of the present invention will become clear the following description of the invention with reference to the accompanying drawings.

BRIEF DESCRIPTION OF THE DRAWINGS

For a better understanding of the invention, and to show how the same may be carried out into effect, reference will now be made, by way of example, with respect to the accompanying drawings, in which.

Throughout the drawings, like reference numerals and symbols are used for designating like or equivalent parts or portions, for simplicity of illustration and explanation.

DETAILED DESCRIPTION OF THE INVENTION

Hereinafter, a preferred embodiment of the present invention will be described in detail with reference to the accompanying drawings.

Figure 1:
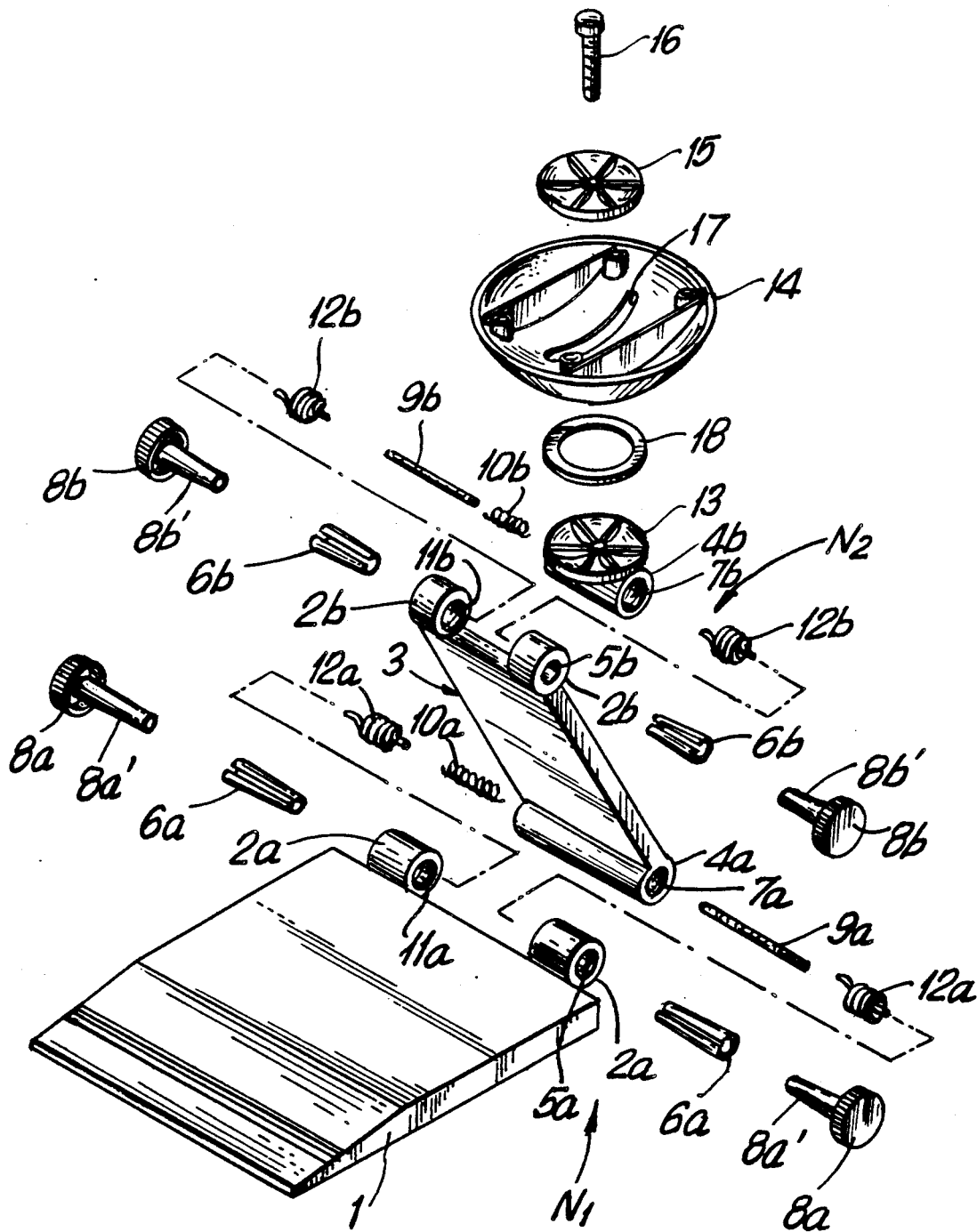
FIG. 1 is an exploded perspective view of the present invention.
Figure 2:
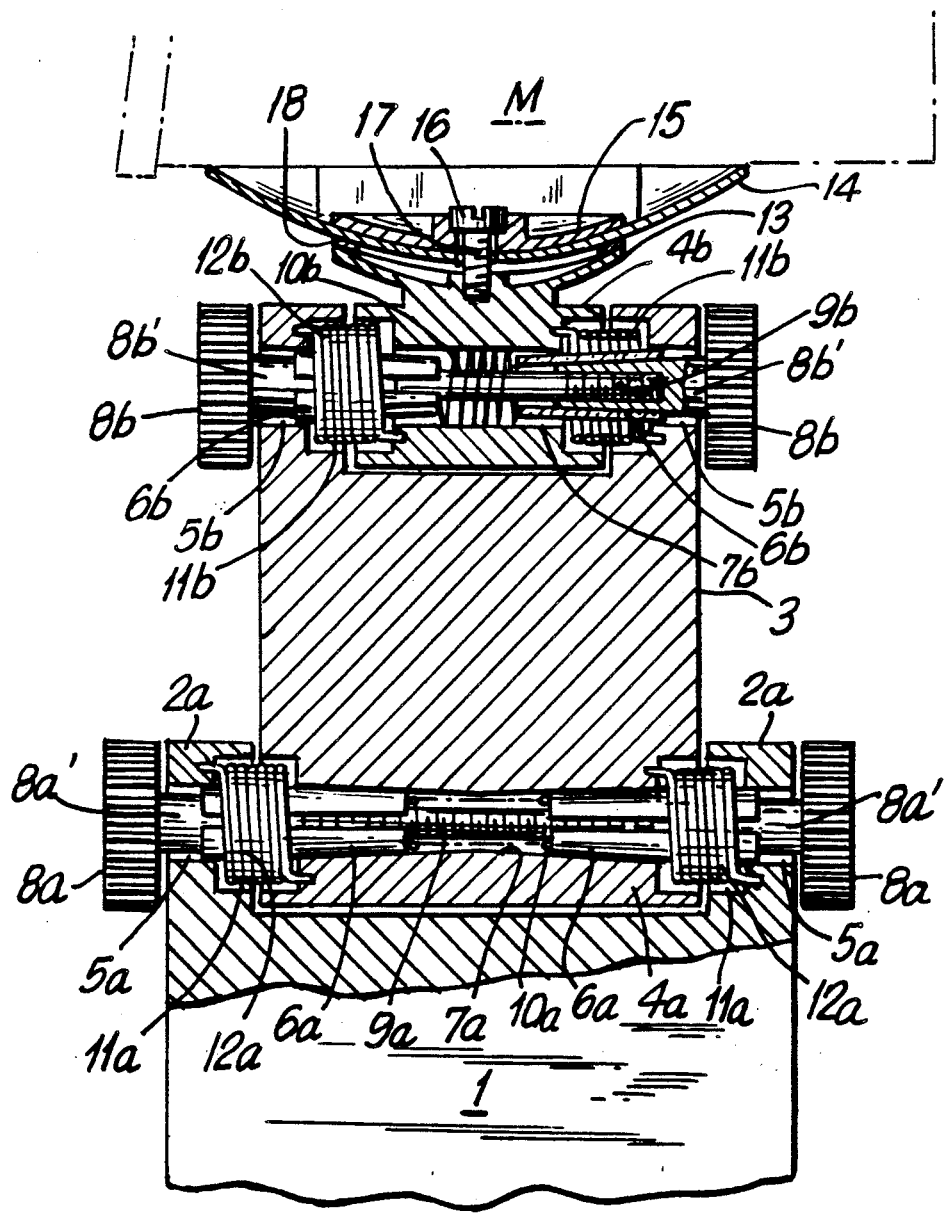
FIG. 2 is an elevational cross sectional view for showing the assembled state of the present invention.

FIG. 1 is an exploded perspective view of the present invention, and FIG. 2 is an elevational cross sectional view showing assembled state of FIG. 1, wherein first knuckle means N1 is mounted at rear side of base 1.

This first knuckle means N1 is structured such that an arm 3 is rotatably fixed to two bosses 2a, 2a which are formed at both end sides of the rear portion of said base 1.

And another boss 4a is formed at the bottom end of arm 3, and each tip ends of tapered bushings 6a, 6a are respectively inserted through each inserting through holes 5a, 5a from both sides into the hole of boss 4a.

Tapered holes 7a, 7a becoming narrower toward inside so as to be contacted in surface with tapered bushings are formed at both sides of said boss 4a into which tapered bushings 6a, 6a are inserted respectively.

Tapered pins 8a', 8a' of the knobs 8a, 8a are respectively inserted into the tapered bushings 6a, 6a, and with which tapered pins 8a', 8a' a screw bar 9a is in threaded engagement.

Accordingly, when the knobs 8a, 8a are turned, the tapered pins 8a', 8a' start to move along the threads of screw bar 9a inwardly or outwardly, and thus the moving of tapered pins 8a', 8a' cause the tapered bushings 6a, 6a to expand or contract, so that the surface contacting force with tapered hole 7a can be controlled.

When knobs 8a, 8a are released, the tapered pins 8a', 8a' move outwardly with the movement of the tapered bushings 6a, 6a which is cause by a compression coil spring 10a contained within the interior of boss 4a.

Further, grooves 11a, 11a located at internally through holes 5a, 5a located at each boss 2a, 2a, can receive torsion springs 12a, 12a which react resiliently when receiving a torsional force. The above described identical structures are provide respectively to right and left of the arm 3.

On the other hand, a second knuckle means N2 is provided at the top end of the arm 3.

The structure of the second knuckle means N2 is similar to that of the first knuckle means N1.

That is, a screw bar 9b is in threaded engagement with each knob 8b, 8b having the same function as knobs 8a, 8a, which are inserted through tapered bushings 6b, 6b and torsion springs 12b, 12b at grooves 11b, 11b into holes 5b, 5b of bosses 2b, 2b respectively, which the tapered bushings 6a, 6b are outwardly urged by a compression coil spring 10b.

In addition, there is a supporting plate 13 with a spherical surface which is integrally formed and located on the top of boss 4b, to which a semispherical body 14 is coupled to the bottom of the display means M which is slidably mounted by bolt 16 through slider 15.

The semispherical body 14 is structured to be able to turn by an angle of 360 degrees on the supporting plate 13.

In the drawing, numeral 18 represents an annular ring.

The operation of the present invention constituted as above will be described in detail as follows.

When the knobs 8a, 8a provided at both sides of first knuckle N1 are tightened, the tapered pins 8a', 8a' are moved along the screw bar 9a toward the center portion, and for this purpose, the knobs are turned in opposite directions manner of right and left to be oppositely of right turning screw coupling and left turning screw coupling.

The tapered pins 8a', 8a' are inserted through tapered bushings 6a, 6a mounted on the external circumference of the pins and then are pushed with a strong surface contacting force against the tapered holes 7a, 7a.

Arm 3 may be stopped at any desired position without turning by itself because knuckle N1 becomes fixed as a result of the friction force existing at the contact between the pins and the tapered bushings 6a, 6a.

However, when the knobs 8a, 8a are released, the tapered pins 8a', 8a' are moved outwardly, and the tapered bushings 6a, 6a are all pushed outwards by the resilient force of the compression coil spring 10a whereby the close contact with the tapered holes 7a, 7a becomes released. These states are shown in FIG. 3.

The release of the close contact by surface of the tapered bushings 6a, 6a makes possible the free turning of the arm 3 and explains why arm 3 can be made to stand or fold.

Figure 3:
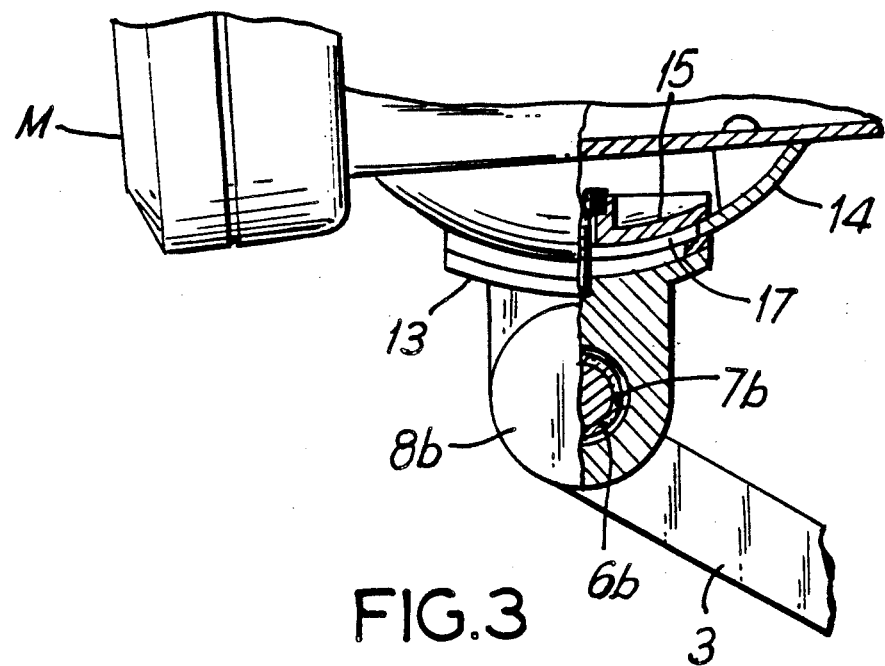
FIG. 3 is a fragmentary half cross sectional view for showing the inclining and swiveling portion of the present invention.

Therefore, when one desires to extend the height of the display means M then, the arm 3 can be made to stand as shown in FIG. 3.

The display means M can easily be lifted up as a result of the opposite resilient force exented by torsion springs 12a, 12a.

Thus, when the knobs 8a, 8a are tightened after setting the pertinent height of the display means M, the aforementioned position of arm 3 can be made and fixed.

Figure 4:
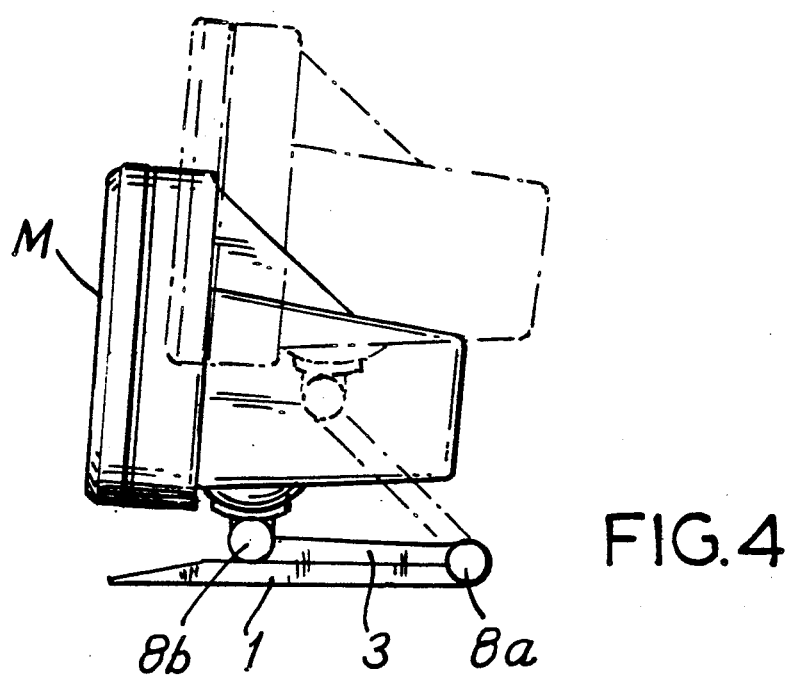
FIG. 4 is a schematic diagram for showing an example of height controlling state of the present invention.

However, when the arm 3 is made to stand only by turning first knuckle means N1, since the display means M is inclined backwards, then the knobs 8b, 8b of the second knuckle means N2 are released and the supporting plate 13 is made to stand and then the knobs 8b, 8b are tightened again, said configuration can be held as it is, and it becomes the configuration shown by one dot chain line in FIG. 4.

Whenever it is required to turn or incline the display means M in response to the amount and angle incident light and the display means M has to be pushed or pulled or turned, then it is possible to control the range of the inclining angle from −10 to +15 and the swivel angle of 360 degrees according to the operation as follow.

At first, with respect to the inclining control, when the display means M is pulled to the front or pushed to the back, the semispherical body 14 is slided within the range of the elongated hole 17, whereby it can be stopped at the desired position by closely contacting slider to the internal surface of semispherical body 14 and tightening the bolt 16.

When it is desired to turn the display means M the semispherical body 14 is turned on the annular ring 18 of the supporting plate 13 whereby a swiveling motion of 360 degree angle becomes possible.

Thus, according to the present invention, the screen of the display means can be adjusted according to the angle of incident light, quantity and directing angle and the height can be controlled in response to the eye level of the user, and thus is an advantage that efficiency of business can be enhanced.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A support for a display means so as to adjust the height, swivel and inclination thereof, said support comprising:
    a base to be placed on a desk or the like, and having first boss means;
    an elongated arm having second and third boss means, respectively at opposite ends of said arm;
    a plate to be connected to the display means, and having fourth boss means;
    first knuckle means rotatably connecting said second boss means at one end of said arm to said first boss means so that said arm is rotatable about a first axis substantially parallel to the desk; and second knuckle means rotatably connecting said third boss means at the other end of said arm to said fourth boss means so that said plate is rotatable about a second axis substantially parallel to said first axis;
    wherein said second and fourth boss means each have tapered bores, said first and second knuckle means each including tapered bushings within said bores respectively; threaded bars respectively within said bores and threaded tapered pins respectively within said tapered bushings and threadedly engaging said threaded bars, whereby degree of rotation of said plate and arm are adjustable;
    comprising torsion spring means interposed between said first and second boss means, and between said third and fourth boss means, respectively.

2. A support according to claim 1, wherein said first boss means is arranged at a rear portion of said base.

3. A support according to claim 1, comprising coil spring means between said tapered bushings.

* * * * *